US012304538B2

(12) United States Patent
Cross et al.

(10) Patent No.: US 12,304,538 B2
(45) Date of Patent: May 20, 2025

(54) RAILWAY SAFETY NOTIFICATION SYSTEM AND DEVICE WITH PROPORTIONAL WARNINGS

(71) Applicant: STC, INC., McLeansboro, IL (US)

(72) Inventors: Brad Cross, McLeansboro, IL (US); Destry Diefenbach, Benton, IL (US); Pete Ksycki, McLeansboro, IL (US); Nicholas Freed, Thompsonville, IL (US)

(73) Assignee: STC, Inc., McLeansboro, IL (US)

( * ) Notice: Subject to any disclaimer, the term of this patent is extended or adjusted under 35 U.S.C. 154(b) by 527 days.

(21) Appl. No.: 17/077,899

(22) Filed: Oct. 22, 2020

(65) Prior Publication Data

US 2021/0107542 A1 Apr. 15, 2021

Related U.S. Application Data

(63) Continuation-in-part of application No. 16/027,700, filed on Jul. 5, 2018, now Pat. No. 11,827,257, which (Continued)

(51) Int. Cl.

*B61L 23/06* (2006.01)
*B61L 15/00* (2006.01)

(Continued)

(52) U.S. Cl.

CPC ........... *B61L 23/06* (2013.01); *B61L 15/0027* (2013.01); *B61L 23/34* (2013.01); *B61L 25/021* (2013.01);

(Continued)

(58) Field of Classification Search

CPC ...... B61L 23/06; B61L 15/0027; B61L 23/34; B61L 25/021; B61L 25/025;

(Continued)

(56) References Cited

U.S. PATENT DOCUMENTS 5,539,398 A 6/1996 Hall et al.
5,661,474 A 8/1997 Douglas (Continued)

FOREIGN PATENT DOCUMENTS

CN 109254298 A 1/2019
JP 2006224737 A * 8/2006

(Continued)

OTHER PUBLICATIONS

Final Office Action from related U.S. Appl. No. 17/077,879, dated Dec. 7, 2023, 9 pages.

(Continued)

*Primary Examiner* — James J Yang
*Assistant Examiner* — Anthony D Afrifa-Kyei
(74) *Attorney, Agent, or Firm* — Lewis Rice LLC

(57) ABSTRACT

Systems and devices that will notify train system maintenance workers of an approaching vehicle and, conversely, will notify the operators and administrators of train systems of train system maintenance workers within the vicinity of an approaching section of track. Embodiments of the safety systems and methods disclosed herein may use proportional warnings based on the speed or proximity of approaching vehicles as well as the specific location of such approaching vehicles relative to worker positions to help avoid worker warning fatigue.

5 Claims, 5 Drawing Sheets

Related U.S. Application Data is a continuation of application No. 15/370,655, filed on Dec. 6, 2016, now Pat. No. 10,029,716, which is a continuation of application No. 13/652,217, filed on Oct. 15, 2012, now Pat. No. 9,542,852.

(60) Provisional application No. 62/924,513, filed on Oct. 22, 2019, provisional application No. 62/924,522, filed on Oct. 22, 2019, provisional application No. 61/547,387, filed on Oct. 14, 2011.

(51) Int. Cl.

| | |
|---|---|
| ***B61L 23/34*** | (2006.01) |
| ***B61L 25/02*** | (2006.01) |
| ***G08G 9/00*** | (2006.01) |

(52) U.S. Cl.

CPC .............. *B61L 25/025* (2013.01); *G08G 9/00* (2013.01); *B61L 2205/04* (2013.01)

(58) Field of Classification Search

CPC ...... B61L 2205/04; B61L 23/00; B61L 27/70; B61L 29/24; B61L 29/28; B61L 29/30; G08G 9/00; G08G 1/161; G08G 1/16; G08G 1/162; G08G 1/163; G08G 1/164; G08G 1/165; G08G 1/166; G08G 1/167; E01F 9/30; E01F 9/654; H04W 24/04; H04W 4/70; B60Q 7/00; B60W 30/16; B60W 30/18154; B60W 40/06; B60W 50/00; B60W 10/06; B60W 10/18; B60W 10/20; B60W 2050/0071; B60W 2050/0073; B60W 2050/0075; B60W 2556/50; B60W 30/02; B60W 30/14; B60W 30/18172; B60W 40/072; B60W 40/076; B60W 50/14; G01S 13/931; G01S 17/86; G01S 17/89; G01S 19/17; G01S 19/42; G01S 19/50; G01S 19/41; G01S 2007/4975; G01S 2013/9322; G01S 2013/93271; G01S 2013/93272; G01S 2013/93273; G01S 2013/9329; G05D 1/0246; G05D 1/0274; G05D 1/0278; G05D 1/0221; G05D 1/0225; G05D 1/0257; G05D 1/027; G05D 2201/0213

See application file for complete search history.

(56) References Cited

U.S. PATENT DOCUMENTS

| | | | | |
|---|---|---|---|---|
| 6,064,319 | A | 5/2000 | Matta | |
| 7,624,952 | B1 * | 12/2009 | Bartek | B61L 23/06 246/477 |
| 8,477,021 | B2 * | 7/2013 | Slack | B60Q 9/008 342/70 |
| 9,542,852 | B2 | 1/2017 | Cross et al. | |
| 10,029,716 | B2 | 7/2018 | Cross et al. | |
| 2002/0186135 | A1 | 12/2002 | Wagner | |
| 2004/0075562 | A1 | 4/2004 | Land | |
| 2005/0068169 | A1 | 3/2005 | Copley et al. | |
| 2005/0134450 | A1 | 6/2005 | Kovach | |
| 2010/0271214 | A1 * | 10/2010 | Frederick | G08B 21/182 340/600 |
| 2011/0006912 | A1 | 1/2011 | Sheardown et al. | |
| 2011/0278401 | A1 * | 11/2011 | Sheardown | B61L 23/06 246/167 A |
| 2013/0143586 | A1 | 6/2013 | Williams et al. | |
| 2015/0060608 | A1 | 3/2015 | Carlson et al. | |
| 2019/0039627 | A1 | 2/2019 | Yamamoto | |
| 2021/0026881 | A1 | 1/2021 | Nakabayashi et al. | |

FOREIGN PATENT DOCUMENTS

| | | | | |
|---|---|---|---|---|
| JP | 2008176600 | A * | 7/2008 | B61L 23/06 |
| KR | 20040060261 | A * | 12/2002 | B61L 23/06 |
| KR | 200326769 | Y1 * | 6/2003 | B61L 23/06 |
| KR | 20110032276 | A | 3/2011 | |
| WO | 2018158711 | A1 | 9/2018 | |

OTHER PUBLICATIONS

Final Office Action in related U.S. Appl. No. 17/077,879, dated Jan. 9, 2024, 10 pages.

* cited by examiner

RAILWAY SAFETY NOTIFICATION SYSTEM AND DEVICE WITH PROPORTIONAL WARNINGS

CROSS REFERENCE TO RELATED APPLICATIONS

This application claims benefit of U.S. Provisional Patent Application Nos. 62/924,522 and 62/924,513 both of which were filed Oct. 22, 2019. This Application is also a Continuation-in-part (CIP) of U.S. Utility patent application Ser. No. 16/027,700, filed Jul. 5, 2018, which is a Continuation of U.S. Utility patent application Ser. No. 15/370,655, filed Dec. 6, 2016, which is a Continuation of U.S. Utility patent application Ser. No. 13/652,217, filed Oct. 15, 2012 and now U.S. Pat. No. 9,542,852, which in turn, claims the benefit of U.S. Provisional Patent Application Ser. No. 61/547,387, filed Oct. 14, 2011. The entire disclosure of all the above documents is herein incorporated by reference.

BACKGROUND OF THE INVENTION

1. Field of the Invention

This disclosure is related to the field of safety devices for transit and roadway maintenance workers and transit vehicles. Specifically, this disclosure is related to systems and devices that will notify train system maintenance workers of an approaching vehicle.

2. Description of the Related Art

As the number of transit routes and light rail lines throughout metropolitan areas increases, so does the potential for transit, worker, and pedestrian accidents. Despite improvements in track signals, train controls, and railroad communication technology, the incidence of fatal train collisions has dramatically increased in recent years. In fact, train injuries and fatalities in the United States have increased about 15% since 1998, a period in which the number of commuter lines, transit lines, and runs per line has increased dramatically in many major metropolitan areas.

Generally, rail, road, and transit maintenance workers are often the most vulnerable for pedestrian accidents on transit routes. These individuals are often working on or in close proximity to transit routes and roads. Thus, their location alone puts them at a higher risk margin for vehicular accidents. In addition, much of the work that rail, transit, and road maintenance workers are engaged in is noisy, high decibel work involving heavy machinery (e.g., jack hammers, sledge hammers, nail guns, blow torches, etc.). The noise associated with this work can make it difficult if not impossible for individuals working on a track, route, or road to hear a train, light rail, or other vehicle coming their way before it is too late. Further, many modern trains and transit vehicles, such as electric trains, are designed to run quietly.

While the operators of the trains, rails, vehicles, and transit routes are often aware of construction zones on the tracks, routes, and roads, workers, in the normal course of their work, can often stray from these zones to other areas—areas where transit operators are not prepared to encounter workers. Further, while workers are often made aware of the vehicle and transit schedule and, by extension, when to expect transit vehicles in areas of construction, transit vehicles can often be ahead of or behind schedule, thus confounding this safety variable. In addition, many workers just simply lose track of time while they are on the job.

Some safety systems for workers exist. For example, those described in U.S. Pat. Nos. 10,029,716 and 9,542,852, the disclosures of which are hereby incorporated in their entirety by reference, disclose safety systems and devices that can be utilized by transit, train, and road maintenance workers and other individuals working in close proximity to transit routes, rails, and roads that have the ability to alert them to the presence of oncoming vehicles (specifically equipped vehicles) and also have the ability to alert transit operators to the presence of individuals on the transit routes, tracks, or roads prior to the time period in which they enter the operator's line of sight.

However, prior art systems have limitations. For example, many prior art systems rely extensively on satellite positioning systems known to one of ordinary skill in the art to determine the locations of transit maintenance workers and vehicles. In some circumstances, however, prior art systems may not be able to use satellite positioning system data. For example, it may be difficult for transit maintenance workers and vehicles to receive satellite positioning system data when located in a tunnel, under a bridge/structure, or even amongst buildings or trees. Under such conditions, if no satellite signals are received, satellite positioning system data cannot be used to assist in determining the locations of transit maintenance workers and vehicles. Even if signals are available but attenuated, the processing of the attenuated signals may cause a delay in the time required to provide location data, or the location data itself may be less accurate. In such cases where satellite positioning system data is unavailable or insufficient, worker safety systems must rely on other sources of information to determine the locations of workers and vehicles within the transit system.

When satellite positioning systems are not available, many systems rely on track detectors. These are systems which are placed on or near specific vehicle tracks or pathways to detect an oncoming vehicle and send out warnings. While these typically do not require satellite access, they also present problems. In the first instance, track detector systems have to operate in a fail safe manner as they need to detect any incoming vehicle as the system's safety announcements are dependent on their detection. This means that they have to be installed correctly, installed robustly enough to not be damaged by the passage of vehicles, and be themselves sufficiently rugged to survive in the track environment. This makes them quite expensive and can often result in construction activity being necessary to install them (replete with its own risks). Further, track detectors also require the ability to communicate with workers in sufficient time to be valuable. Thus, they also often have to be placed at a fairly significant distance from the worksite to be useable. For these types of reasons, on-board vehicle systems are often preferred, but those systems can have satellite communication issues as discussed above.

Further, satellite positioning systems may have additional limitations. For example, satellite positioning systems generally have difficulty in determining where a transit vehicle or worker is located when multiple roadways or rails are stacked vertically on top of each other or in close proximity to each other horizontally. Satellite positioning systems generally treat roadways and rails as two-dimensional planes. Accordingly, in the case of one rail or roadway passing over another, satellite positioning systems generally cannot determine which rail or roadway is occupied by a given vehicle or worker when the vehicle or worker is positioned at the location of the overlap. Further, as anyone who has used a satellite navigation system will know, the systems often have difficulty determining a user's position on two pathways which are right next to each other horizontally as the error in locating the vehicle may be greater than the size of the path. Close horizontal proximity and vertical overlap are common types of situations in a number of rail environments. For example, rail vehicles often are positioned vertically above each other when crossing bridges and tracks are commonly very close together in train tunnels and in subway systems.

Prior art safety systems have used a number of different systems to assist when satellite positioning system data is unavailable or unreliable. For example, prior art safety systems may rely upon location predictions that are based on previous movements or predetermined data. However, such predictions are indirect, at best, and do not precisely determine where any workers or vehicles are within the transit system. In other situations, prior art systems may rely on track detectors or other sensors, which are placed onto or proximate to the vehicle rails or roadways within the transit system, that may determine the presence of, along with other possible information, vehicles at certain points along a given rail or roadway. Such track sensors may be permanently installed along a rail or roadway, or temporarily installed when needed. However, track sensors are expensive, require costly placement and maintenance, may be subject to damage during use, and provide limited information. Further, track sensors require time and effort to be placed and only provide information about vehicles at the location where they are placed.

Without good location information for oncoming vehicles, systems may warn a worker who is in the proximity of a moving vehicle that such a vehicle is around. However, these art systems typically communicate little relevant information other than the mere presence of a potential threat. In such a system, the worker will only be notified that a risk is present. The worker, however, may not know when or even if the vehicle will be present in the worker's location, how fast the vehicle is approaching, or how far away the vehicle is currently. This lack of information may lead to additional problems, such as worker panic when a warning signal is received even if there is no legitimate cause for such level of alarm. Additional problems include worker downtime because the worker may be required to leave the warning area as soon as is possible when they do not know how soon, or if, the vehicle will be at their location. Said another way, most prior art systems essentially maximize worker downtime because the prior art system's warnings are relatively indiscriminate.

An additional issue is that many prior art safety systems suffer from other problems including worker warning fatigue. Worker warning fatigue generally occurs when workers are frequently warned about potential hazards while performing their work. This fatigue also may occur when all warnings given are at a single warning level without any progression in the level of the warning as the risk level increases. Similarly, worker warning fatigue may be particularly sensitive to the use of only high (e.g., loud, fast, strong, annoying, or otherwise intense) warning levels.

While the reasons why workers may become fatigued due to increased warning activity may not be fully understood, the unfortunate result of worker warning fatigue is that workers may become less reactive to safety system warnings or even ignore such warnings if more are provided. Some reasons for the development of worker warning fatigue may be the perception that the warnings are (a) annoying: (b) unnecessary; (c) too frequent; (d) too severe; and (e) the cause of wasted time during the work day. In some cases, workers may disable or reduce the effectiveness of waring devices to which they have access. For example, a worker may deactivate a personal warning device due to a belief that the device provides warnings too frequently.

Another issue with prior safety systems is that, in some situations, it may be impossible or infeasible to equip all vehicles with vehicle control units. In such a situations, it may be desirable to have such vehicles without vehicle control units in service within a train system. For example, some legacy maintenance trains may not be capable of being fitted with modern vehicle control units. Other examples include historic trains that may be traveling in a train system for a special event. In either case, prior safety systems may have no means of determining where these special trains are within the prior safety system or what the trains' direction and speed may be at any given time. This lapse in the prior safety system's control may present serious risks to all those proximate to the tracks in the train system.

In any case, losing the ability to determine the positions of transit maintenance workers and vehicles in real-time increases the risk of a pedestrian accident. Accordingly, there is a need in the art for systems and a methods that can be utilized by transit maintenance workers and other individuals working in close proximity to transit routes, rails, and roadways that has the ability to alert them to the presence of oncoming vehicles (specifically equipped vehicles) and also has the ability to inform them, when multiple rails or roadways are present, as to what routes, rail, and roadway is occupied by the oncoming vehicle and how much of a threat it currently presents.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Described herein, among other things, are systems and devices that will notify train system maintenance workers of an approaching vehicle and, conversely, will notify the operators and administrators of train systems of train system maintenance workers within the vicinity of an approaching section of track. Embodiments of the safety systems and methods disclosed herein may use proportional warnings based on the speed or proximity of approaching vehicles as well as the specific location of such approaching vehicles relative to worker positions to help avoid worker warning fatigue.

A method for alerting a worker to potential danger, the method comprising: equipping a worker with a personal notification unit (PNU); equipping a vehicle with a vehicle communication unit (VCU); establishing a work zone where workers are potentially in danger from an approaching vehicle; said VCU transmitting vehicle information, said vehicle information including at least one of a speed of said vehicle, a direction of travel of said vehicle, an estimated time of arrival of said vehicle to a predetermined point, or a location of said vehicle relative said work zone, to said PNU in said work zone; said PNU determining a level of danger said worker equipped with said PNU is in from said vehicle based at least in part on said vehicle information; and said PNU issuing an alert to said worker, said alert being proportional to said level of danger.

In an embodiment of the method, the VCU utilizes satellite location information to determine said speed of said vehicle, said direction of travel of said vehicle, said estimated time of arrival of said vehicle to a predetermined point, and/or said location of said vehicle relative said work zone.

In an embodiment of the method, the work zone includes an active work area and a silent area.

In an embodiment of the method, if the PNU is in said active work area, said PNU warns said worker of said vehicle; and if said PNU is in said silent area, said PNU does not warn said worker of said vehicle.

In an embodiment of the method, the work zone includes a restricted area and said PNU selects a highest level of danger if said worker enters said restricted area.

In an embodiment of the method, the work zone includes a fenced area and said PNU selects a lower level of danger if said worker leaves said fenced area.

In an embodiment of the method, the PNU determines which area includes said PNU by using satellite location information.

In an embodiment of the method, the PNU in unable to utilize satellite location information to determine which area includes said PNU.

In an embodiment of the method, the PNU utilizes location relative to a beacon placed in said work zone to determine which area includes said PNU.

DETAILED DESCRIPTION OF THE PREFERRED EMBODIMENT(S)

Figure 1:
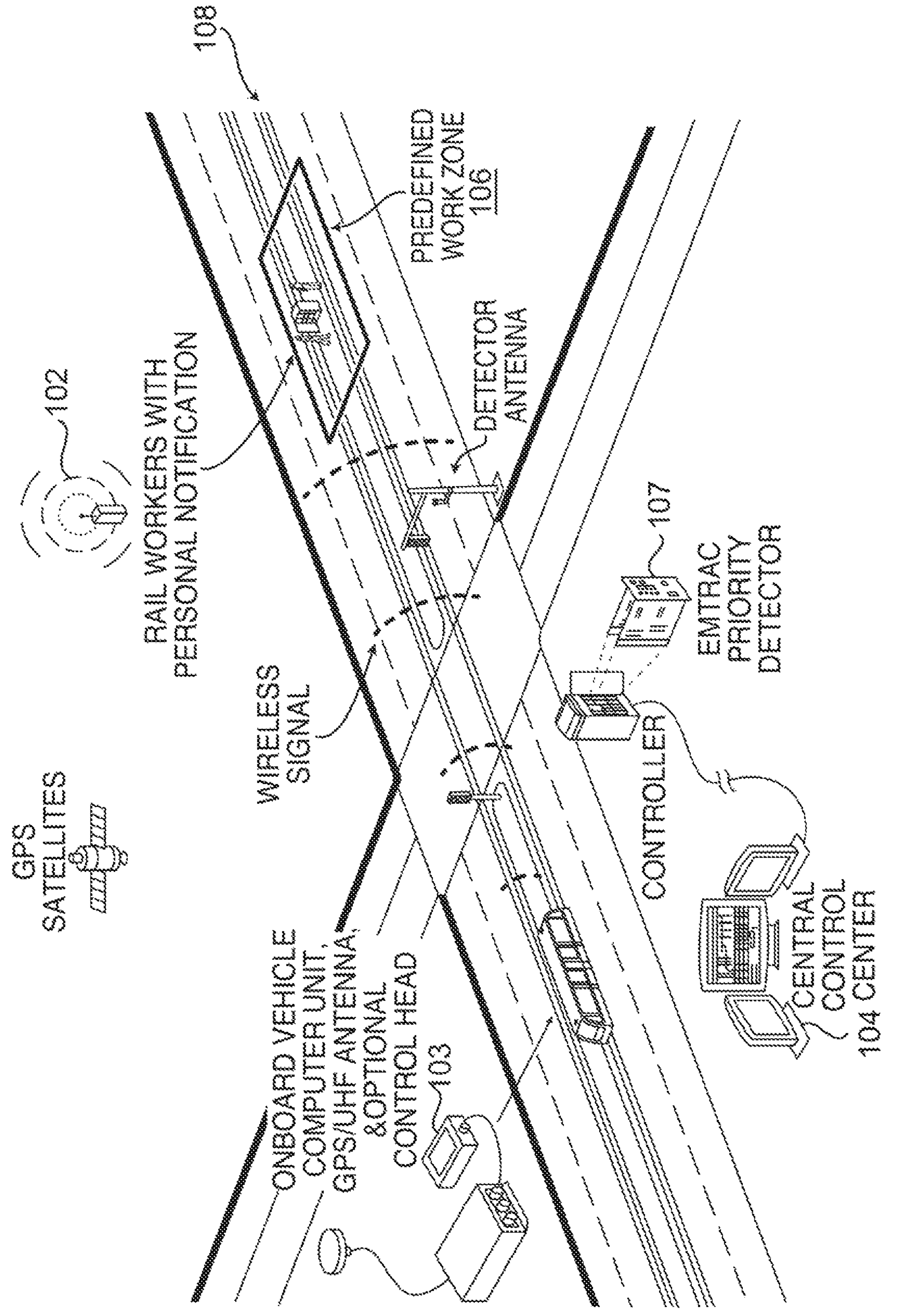
FIG. 1 provides a perspective view of a diagram of an embodiment of a transit safety system and device in use.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Generally, the safety notification methods, systems, and devices (101) described herein are contemplated for use with and in an applicable transit system known to those of ordinary skill in the art and, in certain embodiments, is integrated into existing systems known to those of ordinary skill in the art that monitor and/or control the operation of transit systems. Contemplated applicable transit systems include, but are not limited to, rapid transit, underground, subway, elevated railway, metro, metropolitan railway, light rail, premetro, street cars, trams, interurbans, and dedicated buses and trains. For the purpose of simplicity, the term "train" may be utilized in this application to represent each of these possible transit systems, the term "vehicle" may be utilized to represent the vehicular component of each of these possible transit systems, and the term "track" or "rail" may be utilized to represent the track, line, route, rail, road, or other transit area to be occupied at least at some time by transit vehicles. Further, a route (108), as discussed herein, typically is the planned course of a vehicle through its movement including, for example, all pathways that the vehicle will occupy when taking that planned course. For example, a route (108) may be the tracks for a train to travel from one station or stop to the next.

Generally, the safety device and system (101) disclosed herein serves three main functions; (a) it acts as a warning system for workers equipped with appropriate gear; (b) it acts as a warning system for vehicles, notifying operators of the location of workers relative to the route (108) and the location of the vehicle on the route (108); and (c) it acts as a worker monitoring system allowing for the monitoring of the location of vehicles and workers in the train system as a whole. In one embodiment, these functions are generally carried out through the creation of work zones (106) in the train system and on a vehicle's route (108). In another embodiment, these functions are generally carried out by identifying alert situations based upon the distance, speed, bearing, and/or location-based information exchanged between the components of the system (101). In another embodiment, these functions are generally carried out by identifying a vehicle's proximity to a tunnel wall and the related track and direction information. It is contemplated that, in various embodiments, each of these modalities for identifying alert modes can be utilized together in any combination, or they can be utilized separately.

The expected benefits of the disclosed safety notification device and system (101) are numerous. First, the disclosed device and system (101) increases the safety of the train system by: (a) providing track and direction information when the vehicle may not rely upon GPS data; (b) reducing worker warning fatigue by not providing warnings when a worker is safe and providing proportional warnings to a worker alerting them to the relative level of risk of an oncoming vehicle; (c) increasing the awareness of oncoming vehicles for maintenance workers, even in unfavorable environments and situations; (d) notifying workers and administrators when workers are not located in the correct working zones; and (e) notifying vehicle operators when workers are on or near the route (108) so the speed and direction of the vehicle can be adjusted to ensure safety. Second, the system and device (101) is easily installed and integrated into existing vehicle control and monitoring systems as, in certain embodiments, it is structured to work with the standard equipment in the train system in applicable embodiments, Third, the system and device (101), through its reporting and log creation function, allows for administrators to evaluate trends and identify reoccurring safety issues and locations in the train system as a whole. Finally, the system and device (101) is generally low maintenance. For example, worker devices, in certain embodiments, will require only occasional battery recharging. Further, the radio aspects of vehicle systems used to collect track and direction information is installed in the vehicle, obviating the need to place track sensors or other installations at many points along a track system.

As used herein, the term "transmitter" shall be understood to encompass any electronic device that produces radio waves, or other known communication modalities, for the communication of information over a distance known to those of skill in the art. Further, as used herein, the term "receiver" shall be understood to encompass an electronic circuit known to those of skill in the art that is capable of receiving radio signal inputs, separating the wanted radio signal from all other picked-up radio signals, amplifying the signal to a level suitable for further processing, and converting the signal through demodulation and decoding into usable form. It should also be understood that transmitter and receiver combination "transceivers" are also contemplated for the transmitter/receivers of this application.

Throughout this disclosure, the term "computer" describes hardware that generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks. In this way the functionality of the vehicle computer or the worker's computer may be at a single computer, or may be a network whereby the functions are distributed.

Those of ordinary skill in the art also appreciate that some devices that are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

For purposes of this disclosure, there is significant discussion of a special type of computer referred to as a "mobile device." A mobile device may be, but is not limited to, a smart phone, tablet PC, e-reader, or any other type of mobile computer. Generally speaking, the mobile device is network-enabled and communicating with a server system providing services over a telecommunication or other infrastructure network. A mobile device is essentially a mobile computer, but one that is commonly not associated with any particular location, is also commonly carried on a user's person, and usually is in real-time or near real-time communication with a network.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described herein are contemplated to use computers and computer software typically stored in a computer- or machine-readable storage medium or memory.

Throughout this disclosure, terms used herein to describe or reference media holding software, including without limitation terms such as "media," "storage media," and "memory." may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g. "a remote host"), or may, in verb form, refer to a server providing a service over a network ("hosts a website"), or an access point for a service over a network.

Throughout this disclosure, the term "real-time" generally refers to software performance and/or response time within operational deadlines that are effectively generally cotemporaneous with a reference event in the ordinary user perception of the passage of time for a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational contexts, a system operating in "real-time" may exhibit delays longer than one second, such as where network operations are involved that may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the time required is longer than how long a consumer of the output would wait for the output, or because the number and/or complexity of the calculations, the commercial value of the output would be exceeded by the cost of producing it.

In an embodiment, it is contemplated that the receivers and transmitters of the safety system (101) disclosed in this application will operate on a secure ultra-high frequency (UHF) hopping spread spectrum. However, it should be recognized that operation on this frequency is not determinative as it is contemplated that the safety system (101) could also operate on a fixed-frequency transmission range or any other transmission range or spectrum as well as any communication protocol known to those of skill in the art.

While the safety notification system of this application will be described in conjunction with transit systems and particularly rail transit systems, it should be understood that the device and systems described herein may be utilized in any setting in which personal notification of an approaching vehicle or unit would be prudent and/or necessary as a safety measure such as, but not limited to, working in conjunction with freight rail tracks, on roadways, around watercraft such as in ports, or in airports or heliports. Further, for the purposes of this disclosure, train systems will be discussed in the context of a vehicle on a track. In this context, issues involved in safety systems are simplified because the related vehicles are limited to travelling on predefined and relatively unmovable tracks. For example, in this context, a distance of a few feet from a given track may make a large difference in relative worker safety because the relevant vehicles are limited to travelling only on their predetermined tracks. Thus, if a train system worker moved from one track to the next, their safety situation could easily move from being clearly safe to being clearly in danger, or vice versa.

As a preliminary matter, it is noted that, in an embodiment, the safety device and system (101) disclosed herein are integrated into an existing train monitoring/control system known to those of skill in the art, such as a positive train control system ("PTC"). As used in this application, a PTC is any system known to those of ordinary skill in the art for the monitoring and controlling of the movements of vehicles. Stated differently, any system known to those of ordinary skill in the art through which a vehicle receives and transmits information about its location and which encompasses on-board equipment that enforces this, detecting unsafe or unexpected movement, is contemplated as operating with the systems described in this application. Generally the PTC systems contemplated in this application may involve the additional following basic components to implement under safety systems: (a) a speed display and control unit in the vehicle; (b) a method to dynamically inform the speed control unit of the changing track and signal conditions and, in some scenarios, alter the vehicle's speed based upon changing conditions; (c) a system to actively monitor the speed and location of a vehicle on a particular route; (d) a system to determine a vehicle's estimated time of arrival ("ETA") at a given point on a route; and (e) a system to monitor the position and progress of vehicles, along with other variables, in a train system. Other possible components in the utilized PTC systems include, but are not limited to: an on-board navigation system and track profile database to enforce speed limits; a bi-directional data link to inform signaling equipment of a vehicle's presence; and centralized systems to directly issue movement authorities to vehicles.

Generally PTC systems implemented through fixed signaling infrastructures (such as coded track circuits and wireless transponders to communicate with the on-board speed control unit) and wireless signaling infrastructures (which utilize wireless data radios spread out along a line to transmit dynamic information), among other PTC systems known to those of ordinary skill in the art are contemplated in this application. Generally, PTC systems will also be implemented using a satellite positioning system as their primary source of location data. The satellite positioning system may supply location data to the PTC systems to better determine the positions of workers and vehicles in proximity to a given set of tracks.

In one embodiment as illustrated in FIG. 1, the safety notification systems and devices (101) disclosed herein are generally comprised of at least one worker equipment unit, also known as the personal notification unit ("PNU") (102), and at least one vehicle equipment unit, also known as the vehicle computer unit ("VCU") (103), communicatively attached to each other over a network. The network may also include a central server (104) which is also communicatively attached to the PNU (102) and VCU (103) and can coordinate information transmission between them and receive information from one or both of them. The PNU (102) and VCU (103) typically work together, along with other components of the safety system (101), to improve worker safety. Such improvements are made, in part, by locating and tracking workers and vehicles within the train system, and further warning the workers and vehicles in the case that a vehicle could potentially collide with a worker or other vehicle.

A PNU (102) may typically be worn by a worker. Further, the PNU (102) may typically be capable of communicating with the system (100) and alerting the worker about potential collisions within the train system by notifying the worker of a potentially dangerous approaching vehicle. A VCU (103) may typically be integrated into a vehicle within the train system. Further, the VCU (103) may typically be capable of communicating with the system (100), alerting the vehicle operator, and/or controlling the vehicle when a collision is possible with another VCU (103) or a PNU (102). In this way, a potentially dangerous interaction between a worker/PNU (102) and a vehicle/VCU (103) can be used as the basis to notify either or both parties to the interaction of the potential interaction.

In an embodiment of the present systems and methods, the safety notification systems and devices (101) disclosed herein are intended to be capable of reducing the number and/or frequency of warnings given to a worker's PNU (102) or a vehicle's VCU (103) so that the worker/vehicle is only notified of interactions which have a high likelihood of actual exposure to danger. For example, prior art systems may warn workers who are working on an out-of-service track within a tunnel every time a vehicle enters the tunnel, even if the workers remain on the out-of-service track which is not expected to have a vehicle on it. Similarly, the vehicle may be warned of the presence of workers even though those workers are expected to be out of danger. This is considered a warning given even with a low likelihood of danger. However, should one of the workers on the out-of-service track move to be on the in-service track, that worker is considered to be in a high likelihood of danger.

The disclosed safety system (101) may only provide these workers on an out-of-service track with a reduced intensity warning, or no warning, as long as the workers remain on the out-of-service track. However, should the worker stray to an in-service track (for example because they are moving tools, not currently at the job site, or taking a break) strong warnings can be provided. Similarly, a vehicle may only be provided with a minimal reminder that workers are present in the area if they are in a safe location on the out-of-service track, but a strong warning if one is detected to have left the safe area. Accordingly, the disclosed safety system may be more discerning that prior art systems. This decrease in warnings or warning level may contribute to reducing worker warning fatigue and cause both workers and vehicle operators to react quicker and more decisively to warnings.

Moreover, in an embodiment, the safety notification systems and devices (101) disclosed herein may include PNUs (102) that are capable of providing proportional alert mode warnings to a given worker. For example, prior systems may warn a worker who is working on a given track with a warning at full intensity when a vehicle is approaching the worker's location even if the vehicle is travelling at a low rate of speed and is relatively far away from the worker. The disclosed safety system (101) and related PNUs (102) may only provide a reduced intensity warning that is generally proportional to the vehicle's (a) speed, (b) distance from the PNU (102), and/or (c) ETA. In other embodiments, the intensity of the alert mode warning may be varied proportionally based on a different variable, as would be understood by a person or ordinary skill in the art. Further, warning variables other than the relative intensity may be altered, such as the type, frequency, volume, or other variable of an audible, movement, visual, or other warning.

Figure 4:
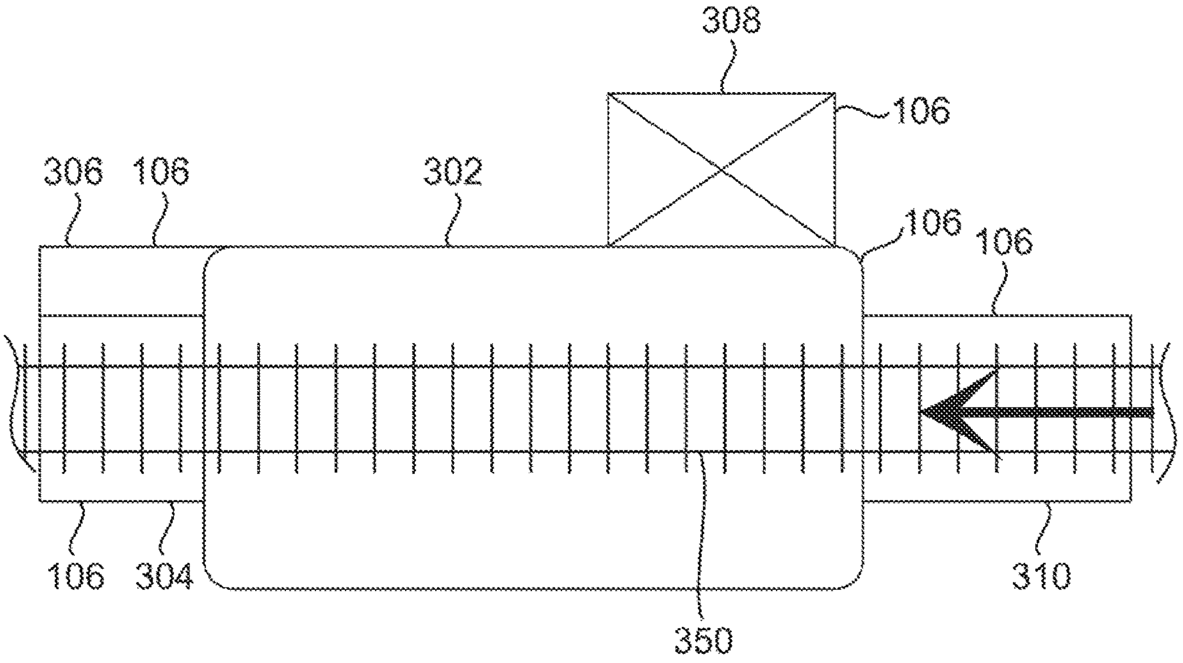
FIG. 4 provides a plan view of the different types of work zones and how they may be positioned relative to a work area.

The safety system (101) of the depicted embodiment includes a plurality of predefined work zones (106) which are discussed in more detail in conjunction with FIG. 4. Notably, the work zones (106) in the system (101) can be of fixed location (e.g., by geographic coordinates) areas in the train system or can be moving relative to a worker or other object (e.g., locations can positioned around a repair vehicle used by workers and whose position illustrates their general location). Generally, the work zones (106) of the system (101), both fixed and mobile, are set up to designate tracks, work areas, or other areas where workers or other personnel may be located. These work zones (106) are defined by their geographic coordinates or by their distance in relation to a component of some system (e.g., a repair vehicle used by workers, or a beacon placed by workers to indicate their current location), and generally may take any shape (e.g., generally circular, polygonal, linear, etc.). These work zones (106) may be set up and configured to elicit different responses from the system (101).

The first work zone (106) contemplated in the embodiment of FIG. 4 is the active work area (304). In this area (304), workers would be expected to be actively working and are therefore in high danger from approaching vehicles as the active work area (304) is in very close proximity to and intersects the tracks (350) and the workers are less likely to be aware of approaching vehicles or to be able to move quickly as they may be hampered by heavy equipment. However, workers are also expected to be in the active work area (304) at effectively all times. Thus, when a vehicle is approaching, the expectation is that workers will be warned to leave the area (304) and move to safety. The vehicle may also be halted while workers are in the active work area (304) due to the high level of danger. Once the workers are in a safe area (306), an approaching vehicle may be released and allowed to proceed.

As shown in FIG. 4, one work zone (106) may be a silent area (306). In the silent area (306), PNUs (102) are prevented from triggering alert responses to the associated workers and typically also from triggering alert responses onboard vehicles. PNUs (102) present within these areas may still receive signals from equipped vehicles (and transmit positions back to VCUs (103)); however, the PNUs will typically remain silent and not issue alert signals (or issue low level warning signals) when contained geographically within the silent area (306). These silent areas (306) may be useful to designate locations where personnel will be present but do not need to receive alert warnings because no safety issue is present. For example, a table may be provided for workers to eat meals and the table may be considered a safe area as it is not in any danger from vehicle movements on a fixed track.

In the depicted embodiment of FIG. 4, the silent area (306) corresponds to an area to the side of the active work area (304) where work is actually being performed. In this silent area (306), equipment may be located that is for performing the work, but a worker in the area is sufficiently distanced from the tracks (350) to not be in danger. Further, when a vehicle approaches the work zone (106) workers in the active work area (304) will be expected to move to the silent area (306) to clear the path of the vehicle. As the area (306) is silent to alarms, when a worker moves here, their active alert from being in the active work area (304) may be silenced or dramatically reduced in intensity or frequency informing them that they are now safe.

In some embodiments, alert signals may be sent to the system (101) and PNU (102) when a PNU is within the silent area (306), but these alert signals will not trigger an alert warning at the PNU (102). Another example of a safe area is a work area that is on an out-of-service and closed track where a vehicle is not expected to be and maybe unable to access under normal operation.

Another work zone (106) may be the track area (302) which is effectively an area of clear danger, but not the active work area (304). Generally, the track area (302) may be set up along portions or the whole area of routes (108) within the overall train system. The track area (302) serves the purpose of alerting personnel within the track area (302) of approaching vehicles and notifying approaching vehicles of the presence of workers on or near the track in track area (302) but not in the active work area (304). When a vehicle approaches this type of area, if a worker equipped with a PNU (102) is determined to be present within the track area (302), a PNU (102) and/or VCU (103) alert mode signal will be activated, but it will typically be a reduced level of alert to those in the active work area (304), but above that of those in the silent area (306), These alert mode signals include, but are not limited to: (a) alert mode warnings to the workers equipped with PNUs (102) within or at a location in close proximity to the track area (302), warning them of an approaching vehicle; (b) alerts to the operators of the vehicles in or approaching the track area notifying them of the presence or lack of presence of workers in the track area; (c) automatically alters the speed of the vehicles if necessary to ensure the safety of the workers in the track area (302); and/or (d) alerts to the operators of the transit system (101) as a whole at the central control server (104) to a possible safety situation.

In the depicted embodiment of FIG. 4, workers in the track area (302) are not necessarily in immediate danger as they are not expected to be working in close proximity to the tracks (350) but simply walking to or from the active work area (304) and would not actually be in an area where they could be hit by the vehicle. As such, they are more likely to be aware of an approaching vehicle than a worker actively engaged in work in the active work area (304) would be and are also more likely to be able to move to a safe distance quickly. However, as they are in proximity to the tracks (350) and could be one them for some reason, it is necessary that they receive some warning of an approaching vehicle to make sure that they are aware of the potential danger and can move away. This arrangement also makes the track area (302) an ideally area for the use of proportional warnings (as discussed later) based on the approaching vehicles speed and proximity. Further, when a vehicle is in the track area, it is preferred that the vehicle be operating at a reduced speed to allow time for workers and the vehicle operator to react to the other's presence, and/or to prepare for the vehicle to enter the active work area (304).

Another type of work zone (106) is a fenced area (308). This area activates an alert signal when a given PNU (102) leaves the defined area. That is, the alert occurs when a worker equipped with a PNU (102) leaves a defined fenced area (308)) regardless of the presence of a threatening vehicle. These fenced areas (308) are useful for maintaining security in a given location. For example, these areas may function to notify a worker equipped with a PNU (102) that they are in the wrong location or to notify the system (101) if the worker equipped with the PNU (102) is outside a defined work zone (106). In the depicted embodiment of FIG. 4, the fenced area (308) comprises the entrance to the work zone (106). Thus, an individual heading out of the work zone may be notified that they are leaving the work zone (106) and reminded that they were supposed to turn in their PNU (102) before departing so it is not lost. Similarly, a worker arriving at work may get notice that they are leaving the entrance area (308) and heading to the track area (302) which means they are now in a warning zone and potential danger and that the PNU (102) is functioning.

Yet another contemplated work zone (106) is the restricted area (310). Generally, the restricted area (310) functions to activate an alert signal when one or more PNUs (102) enter the restricted area (310). In many respects a restricted area (310) is the opposite of a fenced area (308) triggering when entered as opposed to when left. The alert signal may be sent to the PNUs (102) within the restricted area (310) to notify the personnel that they have entered unauthorized or unsafe locations. An alert signal may also be sent to the central control server (104) to notify operators that one or more PNUs (102) are located off the train system in an unauthorized or unsafe (or otherwise sensitive) area.

In the depicted embodiment of FIG. 4, the restricted area (310) comprises the tracks (350) upstream of the track area (302) and fenced area (308) forming the entrance to the work zone (106). In the restricted area (310) location, the system (101) may be unable to provide sufficient warning to the PNU of an approaching vehicle making this area (310) very dangerous to workers. It may also represent the area where a vehicle is intended to slow and/or stop as it approaches the track area (302) to prepare to encounter workers. Further, as it is the wrong direction from the entrance (308) compared to the active work area (304), a worker has no reason to enter the restricted area (310). Thus, there is no reason that a vehicle would expect to encounter a worker in the restricted area (301). To deal with this, a worker entering the area (310) may be instructed to leave the area (310) quickly. Further, should a worker be detected in area (310) VCUs (103) in the area may be instructed to stop their vehicles well ahead of the work zone to prevent a possible collision.

Through the use of these different work zones (106), the system (101) has the ability to act as a vehicle warning system for workers, a worker warning system for vehicles, and a worker and vehicle monitoring system for the overall system. Generally, the work zones (106) may be created, modified, deleted, or otherwise controlled either at the VCUs (103), the central control server (104), the PNUs (102), or at a system manager computer that may interface with the VCUs (103) and/or PNUs (102). In addition, each individual PNU (102) may be set up at the VCU (103) or central control server (104) to respond to work zones (106) and the alert signals it receives differently.

Generally, work zones (106) and component areas (302), (304), (306), (308), and (310) as utilized in the system (101) may be defined by set (or moving) geographic boundaries, which boundaries themselves may generally be set by GPS data. Then, the VCUs (103) and PNUs (102) may determine each of their relationships to the work zones (106) using GPS data. Said another way, the system (10)) may generally rely upon GPS data to determine where any work zones (106) are located, as well as to determine where any VCUs (103) and/or PNUs (102) are located relative to those work zones (106). GPS data may also be used in many embodiments to determine if any VCUs (103) and/or PNUs (102) are located within, located around, located outside of, moving towards, or moving to exit any work zones (106). However, in the context of a tunnel, urban jungle, under a bridge, or other situation where GPS data is not readily available, the system (101) still needs to determine where each work zone (106) and component area (302), (304). (306), (308), and (310), VCU (103), and PNU (102) is located and what their relationships are relative to each other. The system (101) may use a plethora of additional information, such as the track and direction information, to make these determinations.

Individual PNUs (102) can be set up and adjusted to create alert signals at a certain ETA (e.g., 20) seconds prior to arrival); a given distance away (e.g., 2 miles away regardless of direction of travel); if an oncoming vehicle exceeds a defined speed (e.g., greater than 20 mph); and/or if an oncoming vehicle is approaching the current location of a PNU (102) with a certain defined bearing range (e.g., +1-50 degrees). The settings for PNUs (102) can be changed either by group or on an individual basis. In addition to settings, different alert modes for PNUs (102) may be utilized and may be responsive to the reception of an alert signal. Different levels of warning (e.g., low warning to high warning levels) and different alarms (e.g., LED alarm, vibration alarm, and beeper alarm) may be utilized. In one embodiment with 3 levels of warning, level 1 is a low-level "caution" warning, level 2 is a medium warning, and level 3 is an intense possible direct confrontation warning. In other embodiments, discussed in more detail below, the warning level may be generally proportional to the vehicle's (a) speed, (b) distance from the PNU (102), and/or (c) ETA.

Returning to FIG. 1, the PNU (102) is generally a small, portable device capable of receiving GPS or other location data about itself (and other data discussed herein or known in the art, such as track and direction information) and transmitting its location data and storing detailed activity and alert logs, among other functions. Similar to the transceiver in the VCU (103), the worker transceiver of the PNU (102) is generally capable of sending communications to the VCU (103), the central control server (104), a plurality of priority control units (107), other PNUs (102), and other components of the system (101). Further, similar to the receiver in the VCU (103), the receiver of the PNU (102) is generally capable of receiving communications from the VCU (102), the central control server (104), a plurality of priority control units (107), other PNUs (102), and other components of the system (101). Also, like the VCU (103), the PNU (102) is capable of functioning as a receiver for a satellite positioning system (or other known navigation and positioning systems), thereby determining the worker's position, direction, and speed in real-time at any given point.

In one embodiment, it is also contemplated that the PNU (102) contains a power source. Contemplated power sources include, but are not limited to, lithium ion batteries, potassium-ion batteries, nanowire batteries, and self-contained power sources such as solar power, movement-based power generation, and energy harvesting.

The computer of the PNU (102) generally serves four main functions. First, the computer of the PNU (102) transmits, either constantly, in response to some action, or at pre-timed intervals, the location data of the worker equipped with the PNU (102) to the VCU (103), central control server (104), other PNUs (102), a plurality of signal controllers, a plurality of priority detectors (107), and/or other components of the system (101). Second, the computer of the PNU (102) receives communications and information from the VCU (103), central control server (104), other PNUs (102), a plurality of priority detectors (107), and/or other components of the system (101). Such information may include, but is not limited to, automatic vehicle location ("AVL") data of vehicles in the train system, the bearings of approaching vehicles in the train system, the location of work zones (106) or defined routes (108) in the train system, and track and direction information (which may be included in the AVL). Third, the computer of the PNU (102), based upon the location data received from the plurality of VCUs (103) in the system (101), the location of work zones (106), the bearing of VCUs on pre-defined routes (108), the location data of the PNU (102), and track and direction information, amongst other information transmitted over the system (101), can identify alert mode conditions. Fourth, the computer of the PNU (103) can transmit audible, movement, visual, or other warnings to a worker when it determines an alert condition exists or when it receives an alert signal from a VCU (103), the central control server (104), a priority detector (107), other PNUs (102), or other component of the system (101).

Contemplated audio, movement, visual, and other alert mode warnings include, but are not limited to, ultra-bright LEDs, vibrations, and high volume speakers. Notably, the strength of the alert mode warning may vary depending on the risk posed. For example, if a PNU (102) is merely in the vicinity of a vehicle but is not at risk of being hit by the vehicle, a low level warning (e.g., a light vibration or beep) may be emitted. Conversely, if a PNU (102) is in a potential collision zone, a high level warning (e.g., a stronger vibration or siren) may be emitted. These alert mode warnings generally function to ensure that a worker is made aware of an oncoming vehicle and given notice to clear the area, even over the high noise level generally associated with construction sites. Thus, the maintenance worker may be alerted that a vehicle is approaching and they need to clear the area and move a safe distance from the oncoming vehicle.

In an embodiment, the PNU (102) can be a simple hardware device that can be carried by or attached to an individual maintenance worker by a method known to those of ordinary skill in the art. For example, in an embodiment, the device may be a simple handheld hardware device. In other embodiments, it is contemplated that the PNU (102) may be integrated into safety equipment worn by a maintenance worker including, but not limited to, helmets, belts, and safety vests. In these integrated embodiments, the PNU (102) can be permanently attached to the piece of safety equipment or, in alternate embodiments, may simply be temporarily attached to the safety equipment by a pocket, clip, or other applicable attachment modality known to those of ordinary skill in the art. In other embodiments, it is contemplated that the PNU (102) may be integrated into a device commonly carried by the worker, such as a mobile device, tablet computer, or smart phone. In a still further embodiment, the PNU may be attached to a piece of equipment used by a worker. For example, it may be attached to a jackhammer or to a backhoe. In these cases the PNU may act as a warning that both the worker using it and the equipment present a danger to an oncoming vehicle.

Taken together, the PNU (102) is a device which is communicably linked to the VCUs (103), other PNUs (102) and, in other embodiments, the central control server (104), a plurality of priority detectors (107), and/or other components of the system (101), and functions to identify potentially unsafe conditions and also alert maintenance, construction, first-response, and other personnel when potentially unsafe conditions exist. Further, in some embodiments, the functionality and signaling capability of the PNU (102) is integrated into a given train system's monitoring and control system.

In certain embodiments, when a PNU (102) within the system determines that an alert condition is present, the PNU (102) will go into an alert mode. In the alert mode, in certain embodiments, in addition to sending out an alert signal, the PNU (102) may transmit a special high alert packet into the system (101) and to each of the components of the system (101) to notify them of the alert situation. It is contemplated that the PNU (102) may cease to send out this packet when the situation giving rise to the alert signal is no longer present (e.g., the PNU (102) leaves the work zone (106) or active work area (304) or the vehicle slows down).

FIG. 1 depicts the manner in which a PNU (102) determines whether to enter an alert mode in a work zones (106) embodiment of FIG. 4. In this embodiment, a worker equipped with a PNU (102) is located within a work zone (106). Upon receiving an AVL signal or packet, which signals or packets are known to persons of ordinary skill in the art and are discussed in more detail below, from an approaching vehicle, the PNU (102) within the work zone (106) may enter the alert mode when the vehicle reaches a certain predefined ETA, speed, or distance from the active work area (304) if the PNU (102) is in the active work area (304). Alternatively, the PNU (102) may not enter the alert mode for the same vehicle if the PNU (102) is within the silent area (306) or the fenced area (308). A PNU (102) in the track area (302) reacting to the same vehicle may enter a different alert mode than the PNU (102) in the active work area (304) and may even provide different alerts based on the speed and proximity of the approaching vehicle. Finally, a PNU (102) in the restricted area (310) may have already been in an alert mode prior to arrival of the vehicle and may now issue additional warnings or instruct the vehicle to rapidly slow or stop.

In other embodiments, other factors discussed herein may be used in determining if the alert mode is required. In the alert mode, among other things, the alerted PNU (102) may trigger an alert mode warning, as discussed previously, to notify the equipped worker of the high risk event. In addition, in the alert mode, among other things, the PNU (102) may begin to consistently send a special alert mode location-based packet over the network. This special alert mode packet notifies the other components of the system (101) of the high risk event. For example, in one embodiment the central control server (104) may display information regarding a particularly high risk event such as a vehicle approaching when a PNU (102) is within the restricted area (310). This information may include, for example, the location of the worker, the location of the vehicle, and the response of both the vehicle and the worker to the alert on the user interface, informing and allowing system administrators to monitor and modify the event.

In another embodiment of the PNU (102), the PNU (102) will have a panic button. This button functions as a PNU-to-PNU warning signal system. When pressed by a worker, the panic button may send a signal to the other PNUs (102) within a defined area (e.g., all other PNUs (102) within a mile radius). This feature can be used to alert workers of potentially hazardous situations that a single worker encounters, and allow them time to move to safety or assist a worker in need of attention.

Other embodiments of the systems and devices (101) disclosed herein may include PNUs (102) that are capable of providing proportional warnings to a given worker. For example, the PNUs (102) may provide an alert mode warning that is generally proportional to the vehicle's (a) speed, (b) distance from the PNU (102), and/or (c) ETA. In other embodiments, the intensity of the warning may be varied proportionally based on a different variable, as would be understood by a person or ordinary skill in the art. Further, warning variables other than the relative intensity may be altered, such as the frequency, volume, or other variable of an audible, movement, visual, or other warning.

Figure 5:
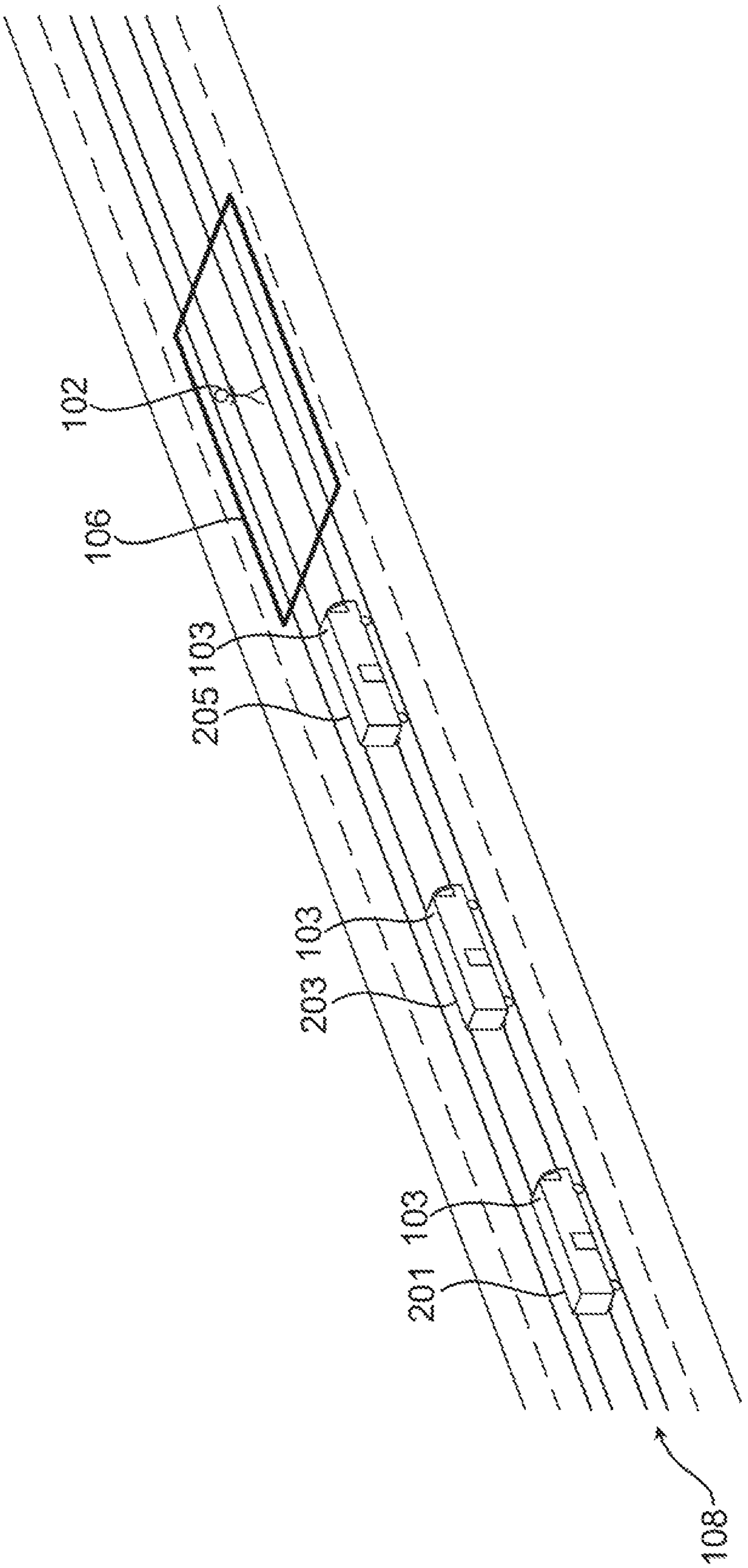
FIG. 5 provides a perspective view of a diagram of an embodiment of a transit safety system and device in use with a proportional warning system.

An example of such a proportional alert mode warning embodiment is depicted in FIG. 5, which depicts a vehicle at a first position (201), a second position (203), and a third position (205). FIG. 5 also depicts a worker having a PNU (102) within a work zone (106). In an embodiment of the systems and devices (101) having proportional warnings, the proportional warnings are based on the distance of the vehicle from the PNU (102) being warned. As depicted in FIG. 5, when the vehicle that is traveling towards the PNU (102) is at the first position (201), an alert mode warning is triggered due to the vehicle's proximity to the PNU (102) within the work zone (106). However, because of the relatively large distance between the vehicle and the PNU (102) at the first position (201), the warning level for the PNU (102) may be a low level. A low level warning may include, for example, the PNU (102) emitting a high pitched, loud warning tone at a low frequency.

As the vehicle travels along its route (108) and continues to approach the PNU (102), the pitch and volume of the warning tone may stay the same while the frequency of the warning tone may steadily increase. For example, as the vehicle reaches the second position (203), the warning level for the PNU (102) may be a medium level. A medium level warning may include, for example, the PNU (102) emitting a high pitched, loud warning tone at a higher frequency than for the low level warning.

Again, as the vehicle travels along its route (108) and continues to approach the PNU (102), the pitch and volume of the warning tone may stay the same while the frequency of the warning tone may steadily increase. For example, as the vehicle reaches the third position (205), the warning level for the PNU (102) may be a high level. A high level warning may include, for example, the PNU (102) emitting a high pitched, loud warning tone at a higher frequency than for the low level warning or for the medium level warning. In some embodiments, the high pitched, loud tone may have such a high frequency that it appears to be a continuous tone without any periods of low volume.

In other embodiments, other aspects of the alert mode warning may be altered proportionally to the risk posed by oncoming vehicles. For example, as discussed above, any aspect of the available warnings, whether visual, audible, movement, or otherwise, may be altered and increased in intensity as the vehicle moves closer to the PNU (102). Further, as a means of increasing the intensity of the alert mode warning, additional warnings types may be used to signify an increased warning level. For example, when the vehicle is at the first position (201), the warning may include a visual warning, such as a flashing or strobing light. Then, when the vehicle is at the second position (203), the warning may include both a visual warning (flashing or strobing light) and an audible warning (a beep, tone, or other sound). Next, as the vehicle reaches the third position (205), the warning may include each of a visual warning (flashing or strobing light), an audible warning (a beep, tone, or other sound), and a movement warning (vibrations). This example is intended only to be illustrative, and any combination of warnings and alterations of properties of those warnings may be used to provide a proportional alert mode warning to the worker via the PNU (102). Further, each type of warning may itself be increased proportionally as the vehicle approaches the PNU (102).

In some embodiments, the proportional warnings are not continuously and directly proportional, while in other embodiments the warnings are continuously and directly proportional. In some embodiments, the warnings may be quantized, increasing by a level at predefined criteria, including without limitation certain values for one or more of a vehicle's distance from the PNU (102), the vehicle's speed, and the vehicle's ETA. In other embodiments, the alert mode warnings may be proportional for certain situations and not proportional for others. For example, the warning may be proportional to the vehicle's distance from a given PNU (102) until or unless the vehicle exceeds a predetermined speed and/or a predetermined ETA. In such an embodiment, the warning level may ascend to the highest level immediately once the vehicle exceeds the predetermined speed and/or the predetermined ETA.

Both the PNU (102) and the VCU (103) are comprised of at least a receiver, a transmitter, a computer, and a navigation system. In general, as will be described further herein, the one or more PNUs (102) in the system and the one or more VCUs (103) in the system are consistently sending and receiving location-based packaged data over the network. Based upon this exchanged location-based data, the route (108) and bearing of one or more vehicles in the train system, and/or the location of the one or more vehicles or the one or more PNUs (102) relative to a designated work zone (106), an alert mode is triggered by the one or more PNUs (102), the one or more VCUs (103), or central control server (104). Among other things, when the alert mode is activated in the system (101), certain alert signals may be set off and alert mode warnings activated. It is contemplated that the alert mode warnings may take on varying levels of intensity (e.g., a low level warning for a low risk situation, a high level warning for a high risk situation). These alert mode warnings and alert signals may notify a worker equipped with a PNU (102), a vehicle operator, and/or an administrator of a train system of a potentially dangerous interaction between a PNU (102) equipped worker and a VCU (103) equipped vehicle within the train system.

In an embodiment, the VCU (103) of the safety system (101) is generally capable of sending communications to and receiving communications from a plurality of PNUs (102), a central control server (104), and a plurality of priority detectors (107), amongst other components in the train system. The VCU (103) is generally an onboard unit, in certain embodiments integrated with a PTC system, that tracks real-time vehicle location, transmits approaching-vehicle alerts, receives signals from other components in the train system (such as alert signals from PNUs (102)), controls or has the ability to alter vehicle function, and stores activity logs. Alternatively, the VCU (103) may be mobile between different vehicles but currently onboard a specific one such as, for example, being carried by a specific train conductor or engineer regardless of the vehicle they are onboard. The VCU (103) may also transmit signal priority requests, in addition to other functions. In addition, the VCU (103) is generally capable of functioning as a receiver for a satellite positioning system as the VCU (103) will typically need to be able to determine the location of the vehicle relative to the various components of a work zone (106).

Installation of the VCU (103) of the safety system (101) into a vehicle can be either permanent, by direct integration into the vehicle—particularly into the PTC (102) of the particular vehicle and the overall train system—or temporary, through a mobile receiver that can be taken into and removed from the vehicle. Generally, a GPS receiver (or other contemplated positioning system) of the VCU (103) will function to determine the vehicle's position, direction, speed, and bearing relative to the vehicle's route (108) and defined work zones (106) on the route (108) in real time at any given point during its travels. A second radio receiver will function to receive the information and radio signals transmitted by a plurality of PNUs (102), the central control server (104), and plurality of priority detectors (107), amongst other components in the network, while the transmitter functions to transmit information and radio signals to a plurality of PNUs (102), the central control server (104), and plurality of priority detectors (107), amongst other components in the network. Further, the VCU (103) and/or the safety system (101) may use track and direction information, disclosed further herein, to assist in determining navigation and positioning.

The computer of the VCU (103) (and, in some embodiments, the central control server (104)), through the inputs received, in part, from one or more PNUs (102) in the system (101), knowledge of the route (108), established work zones (106), established routes (108), the current speed of the vehicle, the vehicle's track and direction information, the vehicle's heading, the vehicle's bearing, the presence of PNU (102) alert signals in the network, and the vehicle's position, among other inputs, in certain embodiments, functions to send safety signals to and receive safety signals from PNUs (102) in the network, the vehicle operator, and operators at the central control server (104) monitoring the overall system (101). For example, in one operation, an alert signal may be sent to an approaching vehicle when one or more workers equipped with a PNU (102) are in an established work zone (106) in the route (108). In another operation, an alert signal may be sent to an approaching vehicle when one or more workers equipped with a PNU (102) are within a certain location, time, bearing, distance, or speed of a vehicle within the train system.

In practice, in an embodiment, the disclosed safety notification system and device (101) would work as follows. First, a given PNU (102) would determine and transmit the location-based coordinates of the worker wearing the unit to at least one VCU (103), a plurality of priority detectors (107), other PNUs (102), and/or the central control center (104). This may be as simple as what area (302), (304), (306), (308), or (310) the PNU (102) is currently within or may be more specific. Further, a given VCU (103) would transmit its AVL information to the plurality of PNUs (102) in the train system, including, when available, track and direction information. Upon the exchange of this information, based upon the location of the worker, the speed, bearing, and location of the vehicle, the track and direction information, the vehicle's scheduled route (108), whether or not the PNU (102) is in a defined work zone (106), the type of area within the work zone (106) where the PNU (102) and/or VCU (103) is (e.g. active work area (304), track area (302), silent area (306), fenced area (308), or restricted area (310)), whether or not the PNU (102) is in a defined route (108), and other defined variables, the PNU (102) determines whether or not an alert mode needs to be triggered by the PNU (102) and transmitted to the other components of the system (101).

Upon activation of the alert mode, the PNU (102) may trigger an alert signal and an alert mode warning to notify the worker via audio, movement, visual, or other signals that the worker is in a dangerous location. The warning sound made by the PNU (102) can be modified via tone or the spacing and rhythm of the tones to represent the severity of the alert. That is, the worker may be given a proportional alert mode warning by the PNU (102) to indicate the severity of the alert. This proportional alert mode warning may indicate to the worker that the worker should immediately leave their current location and head to a safer location. In low severity alert situations, the worker may take other precautions before leaving the track area, such as removing tools. In embodiments where the worker is given a proportional warning, the worker may be able to adjust their behavior to the severity of the warning indicated by the PNU (102). For example, the worker may know they simply need to avoid dangerous locations within their area until the vehicle has passed, or it can simply make then aware of the danger situation so they stay a safe distance from the tracks (350).

In the alternative, the VCU (103) (or other component of the system, such as the central service (104) or a PNU (102)) can determine when a PNU (102) is within a work zone (106) and send the alert mode signal to the PNU (102). In addition, any signal sent by either the PNU (102) or the VCU (103) may also be sent to the central control server (104) notifying the central control server (104) of the impending potential safety issue presented by the situation.

In the embodiment of the system (101) in which the VCU (103) controls the vehicle's speed, an embodiment of the system (101) generally works as follows. First, based upon the exchange of information between a PNU (102) and a plurality of VCUs (103) in the system, the speed, bearing, and location of the vehicle, the track and direction information, the vehicle's scheduled route (108), whether or not the PNU (102) is in a defined work zone (106), the area within the work zone (106) where the PNU (102) currently is, whether or not the PNU (102) is in a defined route (108), and other defined variables, the PNU (102) determines whether or not an alert mode needs to be triggered by the PNU (102) and transmitted to the other components of the system (101). When the alert mode is triggered and sent to a VCU (103) in the system (101), the VCU (103), upon receiving the alert mode, may slow down to a speed that will allow it to stop, if needed, before encountering the PNU-equipped worker. This embodiment of the system (101) is particularly helpful in curved sections of the track where a vehicle operator cannot see objects on the track beyond the bend, such as in a tunnel (111).

In one embodiment, if it is determined that a worker is on or near a dangerous area (e.g. active work area (302) within a work zone (106) or within a particular bearing from a vehicle's route (108), generally the VCU (103) computer (in some embodiments through the PTC) will instruct the vehicle to gradually slow down to a speed that will allow it to stop, if needed, before encountering the worker on the tracks. If, later, the VCU (103) receives inputs that the worker has left the work zone (106) or the particular high risk bearing from the vehicle's route (108), the vehicle will be instructed to resume its normal cruising speed.

Further, in certain embodiments, the VCU (103) will also send AVL packets to the other components of the network, in particular to the plurality of PNUs (102) in the network. In other embodiments, it is also contemplated that the AVL signal can be picked up by a plurality of priority detectors (107) in the system (10) and relayed to the central control server (104). The AVL signals include, but are not limited to, location-based information about the vehicle (e.g., its speed, acceleration, direction, route (108), bearing, etc., which is typically produced, at least in part, using OPS data) and information about which track, and in which direction, the vehicle is travelling ("track and direction information"). In an embodiment, it is contemplated that these AVL signals will be sent at automatically defined intervals (e.g., every 30 seconds). In other embodiments, the AVL signals can be sent conditionally in response to an event (such as the VCU (103) receiving a signal from a PNU (102) in the system (101)), manually by an operator, or in a combination of automatic, manual, and conditioned transmissions. In certain embodiments, these AVL signals are transmitted through the network to the plurality of PNUs (102).

In one embodiment of the computer of the VCU (103), the computer will be equipped with monitoring software that allows for the real-time monitoring and display of worker activity and locations on a user interface. It is contemplated that this user interface can be located in the vehicle, at a central or regional monitor, or via a mobile interface known to those of ordinary skill in the art, such as a mobile device, tablet computer, or smart phone. Further, it is contemplated that the interface may display worker locations on or near the track or route (108) on geographic maps. The interface may also show the real-time location of the one or more PNUs (102) in the train system. Further, in another embodiment, it is contemplated that the computer of the VCU (103) may have the capability to create detailed logs and reports that show worker location and alert histories along the track or route (108). These logs and reports may be generated and automatically communicated to administrators or other interested individuals via, for example, email or other electronic messaging.

In another embodiment, it is contemplated that the computer of the VCU (103) may have multiple communication functions including, but not limited to, PNU warning (the communication in which a signal is sent to a given PNU (102), warning of an impending vehicle, which may include track and direction information), signal priority requests, and PTC (e.g., controlling the speed and direction of a vehicle while travelling along a route (108)).

It should be recognized from the above, that both the PNUs (102) and VCUs (103) will typically need access to location information about themselves. For VCUs (103), location information will generally be determined by satellite positioning and any satellite positioning system known to one of ordinary skill in the art is contemplated including, but not limited to, the Global Positioning System (GPS), the Russian Global Navigation Satellite System (GLONASS), the Chinese Compass navigation system, and the European Union's Galileo positioning system. Herein, the term "GPS" may be utilized in this application to represent any combination of any satellite position system(s) known in the art. Again, any receiver technology known to those of skill in the art that is able to calculate its position by precisely timing the signals sent by satellites is a contemplated receiver in the safety system (101). Notably, in other embodiments, it is also contemplated that navigation and positioning may be determined by dead reckoning, triangulation of cell phone signals, inertial guidance mechanisms, track sensors, or other positioning technologies in place of or in addition to GPS systems. Similarly, each of the PNUs will also typically need location information so it can determine its location within a work zone (106) and within the various areas (302), (304), (306), (308) and (210) within a work zone. This will also typically be a GPS location system as contemplated above for VCUs (103).

It should be recognized, however, that there are a number of situations where either the PNU (102) or VCU (103) cannot access satellite GPS information. In these cases, it is necessary to provide location information using an alternative mechanism. This is typically easier for PNUs (102) as the workers are in a more fixed location than VCUs which would easily be travelling thousands of miles. Typically, it will be known for any given work zone (106) that PNUs in or near the work zone (106) will have limited GPS access. For example, when work is performed in a tunnel, it is unlikely that PNUs (102) will have any substantial GPS access at all. In these cases, the PNU may utilize other location technologies. For example, the various areas (302), (304), (306), (308), and (310) of the work zone (106) may be established based on the proximity of the PNU (102) to one or more fixed beacon(s) placed within the work zone (106) for this purpose or may be based on dead reckoning relative to a fixed known location, such as from the point of the PNU (102) being activated by being removed from a known charging location. As PNUs are not expected to stray from the work zone (106) in any substantial manner, these technologies are fairly easy to implement.

In an embodiment of the PNU (102) and the system (101), the PNU (102) may also have a fail safe operation. In PNUs (102) with this operation, the PNU (102) will enter a fail safe alert mode and send a notification to a worker and the system (101) as a whole as discussed further herein when the PNU (102) losses its ability to determine its location. For example, PNUs (102) with GPS-based location methodologies may enter into the fail safe alert mode when the satellite signal is lost (e.g., when a worker enters a tunnel (111) and the PNU (102) can no longer determine its location in real-time), In certain embodiments, it is contemplated that the PNU (102) may emit a lower level warning (such as a low beep) when it enters the fail safe alert mode. In this fail safe operation, the location-based information alert packet issued by the PNU (102) when the fail safe mode is activated retains the last detected position of the PNU (102). If a PNU (102) receives an AVL packet from a VCU (103) while the fail safe mode is activated (e.g., when a vehicle enters the tunnel (111)), the PNU (102) may automatically emit a high warning signal.

In some embodiments, a special alert signal may be triggered and broadcasted from the PNU (102) to the worker. Such a special alert signal may be followed by a special alert warning to indicate clearly to the worker that the PNU (102) is in a fail safe mode. If track and direction data is available in the AVL packet, which is discussed in more detail below, the PNU (102) may alert the worker as to which direction the vehicle is heading and on what track. The PNU (102) may generally leave the fail safe alert mode when the PNU (102) regains its ability to determine its location. Further, in another contemplated embodiment, fixed special work zones (106) may be established around tunnels and other obstructions in a train system that could alter, modify, or terminate a PNUs (102) ability to determine its location in real-time. These areas may also be designated as restricted areas (210) within a work zone (106) When a PNU (102) enters these fixed special work zones (106), a fail-safe mode is activated, as discussed above.

It should be recognized that while generating location information for a PNU (102) when there is no or inaccurate GPS information can be relatively straightforward, when a VCU (103) does not have accurate GPS information, it can be more problematic as generating the AVL packets can be highly problematic using beacons and similar technology as the VCU will typically be moving over greater distances and at a much faster rate and the motion of the vehicle is often not as easily changed as that of the workers. One concern for VCU AVL Packet generation is dealing with temporary situations around workers where the GPS signal is lost or where a VCU may be temporarily blind as to its location. A key example of this is work within tunnels and similar locations such as are common in subways or on bridges where tracks may be positioned vertically above each other. In these types of locations, worker's positions are often very limited by the walls of the tunnel or the confines of the bridge. Further, the track areas are usually quite tight and therefore it can matter greatly for safety which direction a vehicle is coming from and often which track it is on.

It is not surprising in subway and other tunnels for the tunnel to be limited to two tracks on which vehicles will typically operate in both directions. Often, one track is specific to each direction and trains may pass within inches of each other filling the tunnel when two are present. In still further tunnels, there may only be a single track where vehicle approach from both directions depending on switching outside the tunnel.

Inside a subway tunnel workers will often have to move from one in-use track to another in-use track as a train approaches as this may be the only available space for them to occupy. Many tunnels also include cut-outs and similar structures where a worker can move to the side of the tunnel and into a small area which if cut-out of the wall of the tunnel for the specific purpose of allowing them to stand clear of the vehicle's passage. Accurate use of both the cut-outs and a currently unused track are highly dependent on the worker knowing not only that a vehicle is approaching, but on which track it is approaching and in what direction it is approaching from. This can be particularly true for a worker which is approaching a work area where one of the tracks is closed or where only a single track exists and does not know if an approaching vehicle is between them and the work area, or behind them.

Figure 2:
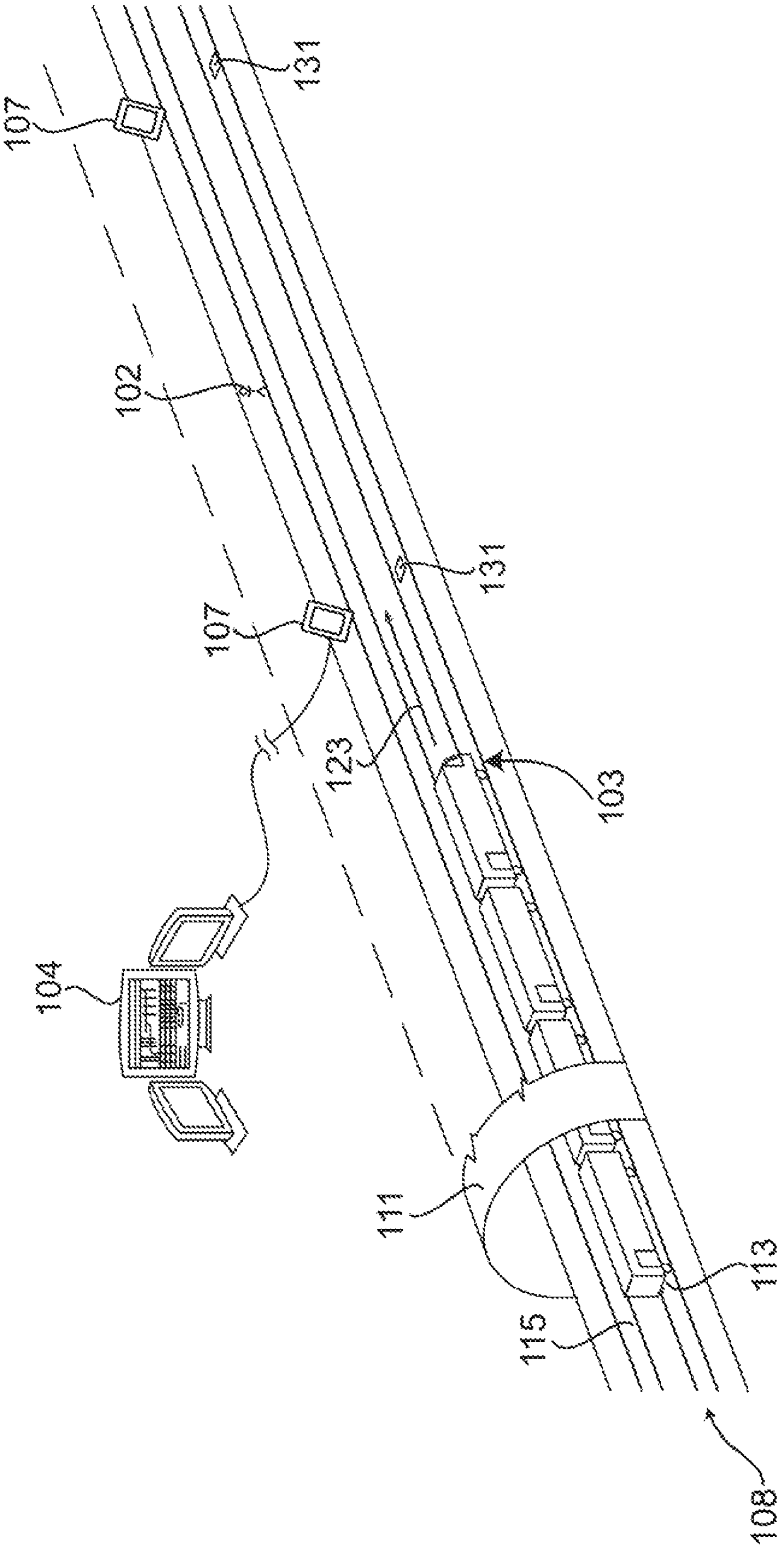
FIG. 2 provides a perspective view of a diagram of an embodiment of a transit safety system and device in use within a tunnel.
Figure 3:
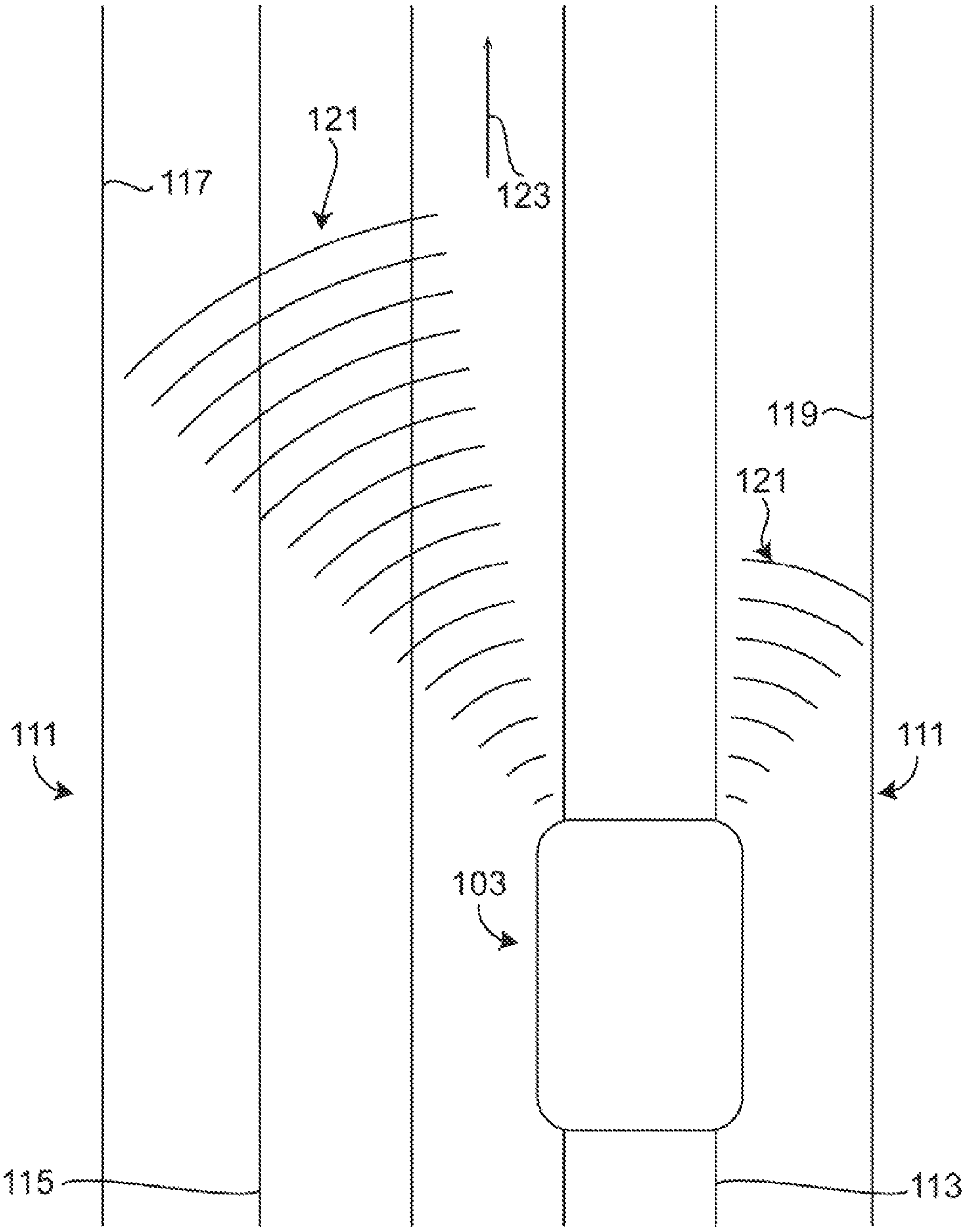
FIG. 3 provides a plan view of a diagram of an embodiment of a transit safety system and device in use within a tunnel.

In an embodiment, the VCU (103) is designed to be able to send AVL packets including track and direction information even when the vehicle is in a location that does not have reliable access to GPS data such as being within a tunnel. For example, the track information may generally indicate on which track a vehicle is travelling when multiple tracks are present in the same area. As best depicted in FIGS. 2 and 3, the vehicle having the VCU (103) may be traveling within a tunnel (111) without access to GPS data. Within the tunnel (111) there may also be some workers having one or more PNUs (102). In such a situation, the VCU (103) may generally know in which direction (123) the vehicle is traveling which will often provide track information as well as relative directions. This knowledge may generally be based on data generated prior to entering the tunnel (111), for example, GPS data, or by using any other data known in the art. Complimenting this knowledge is predetermined information on the geospatial track layout for the tunnel (111). In particular, the VCU (103) may be preprogrammed to know the number and orientations of the tracks (108) within the tunnel (111).

In the embodiment depicted in FIGS. 2 and 3, the calculation is more sophisticated. In FIGS. 2 and 3 there are two tracks, a first track (113) and a second track (115). In this embodiment, a vehicle may use either the first track (113) or the second track (115) regardless of the direction of travel. Further, the VCU (103) may determine the track information using numerous different methods and the preprogrammed track number and orientation information. For example, the vehicle may include a plurality of transmitters and sensors for transmitting and sensing radio signals. The radio signals (121) may be transmitted from the vehicle in all directions or any other arrangement for the transmission of radio signals may be used. As the vehicle and the radio signals (121) move forward, the signals (121) will eventually reach the walls (117, 119) of the tunnel (111).

In the embodiment depicted in FIG. 3, the radio signals (121) reach the closer wall (119) before reaching the further wall (117). The radio signals (121) are reflected off of each of the walls (117, 119), eventually returning to the vehicle. The radio signals (121) traveling in the direction of the closer wall (119) will return to and be received by the vehicle before the radio signals (121) traveling in the direction of the further wall (117). The VCU (103) is fed all of the received signals and their timing, and with this data, may be able to determine which wall (117, 119) is closer in proximity to the vehicle which, combined with knowledge of where the vehicle entered the tunnel, will allow the VCU (103) to specify to the PNU (102) which track the vehicle is on.

In some embodiments, the radio signals (121) propagated towards each wall may be the same signal. In other embodiments, the radio signals (121) propagated towards each wall (117, 119) may be different signals. The radio signals (121) may be differentiated by any method known in the communications arts, including without limitation multiplexing. The received radio signals (121) may be processed by the VCU (103) to determine the lateral positioning of the vehicle within the tunnel (111). This may, in turn, be used in conjunction with the preprogrammed track information to determine on which track the vehicle is travelling. Further, the VCU (103) may signal to all PNUs (102) within the tunnel (111) (or otherwise proximate to the vehicle) that the vehicle is oncoming, its direction, and the track it occupies.

In another embodiment, the system for transmitting and receiving radio signals (121) for the detection of proximate walls may be relatively short range in its reach. Stated differently, the radio signals (121) may quickly attenuate over distance. In such an embodiment, the system for transmitting and receiving radio signals (121) may transmit radio signals (121) in all directions. The radio signals (121) then propagate towards the walls (117, 119) of the tunnel (111). In this case, the radio signals (121) that propagate in the direction of the closer wall (119) would reflect off of the close wall (119) and be returned to and sensed by the system for transmitting and receiving radio signals (121). On the other hand, due to the short range of the system for transmitting and receiving radio signals (121), the radio signals (121) that propagate in the direction of the further wall (117) would not be retuned at all. Accordingly, based on the returned and sensed radio signals (121), the VCU (103) may determine the lateral positioning of the vehicle within the tunnel (111). It should be recognized that in a tunnel with only a single track, a closer wall may be determined by simply mounting the signal source offset from the center line of the vehicle.

In some embodiments, the track information discussed above may be converted into direction information by the VCU (103). For example, when only two tracks are present in a tunnel (111), and one track is offline, the VCU (103) can use its ability to determine the closer wall to determine the vehicle's heading, based on its predetermined knowledge of the tracks in the tunnel (III) and that one track is closed while the other is open. In such a case, the VCU (103) would know which track is available and where the wall of the tunnel (111) is relative to the available track. For example, if a tunnel (111) runs North-South, has two tracks (one on the West side of the tunnel (111) and one on the East side of the tunnel (111)), and the West side track is closed to vehicle traffic, if the closest wall is on the right side of the vehicle moving through the tunnel, then the vehicle is moving in the North direction. Further, in this scenario, if the closest wall is on the left side of the vehicle moving through the tunnel (111), then the vehicle is moving in the South direction. Accordingly, the determination of the vehicle's position relative to the tunnel (111) walls (117, 119) may have many different uses in the contemplated safety notification system and device (101).

Wall location information can similarly be used for tracks which are above each other. For example, on a bridge it will often be the case that there is an inner wall to the track, but the outer wall may be only cabling or open space or may have substantial breaks. In a case where there is only a single track open, the side of the vehicle which has the wall can determine which direction the vehicle is traveling. In the event that both tracks are in use, the location of the wall can determine which track the vehicle is on, direction, or both.

In yet another embodiment, some of the functions of the VCU (103) may be supplemented or even replaced by a LIDAR system to act to provide location information. As shown in FIG. 2, the LIDAR system may include a plurality of LiDAR detectors (131) that are capable of determining the presence and rate of travel of vehicles on tracks with great repeatability. The term "LIDAR" is often considered to be an acronym for "light detection and ranging." These LIDAR detectors (131) typically include a laser or array of lasers that are directed away from the LIDAR detector (131). Laser light emitted from a LIDAR detector (131) may reflect off objects in the line of sight of the laser of the LIDAR detector (131), sending the laser light back to the LiDAR detector (131). The LiDAR detector (131) may then be able to sense the return of the laser light. A timer may be started when the laser light is emitted and stopped when the reflected laser light is detected. This time may be used to measure distances between the LIDAR detector (131) and the reflecting object. Further, by using successive measurements made at known time intervals, the relative speed between a LIDAR detector (131) and the object, as well as that objects current direction of travel, may be determined.

As depicted in FIG. 2, LIDAR detectors (131) used in the system (100) may be installed at intervals along tracks and may be coupled with system components, such as priority detectors (107) to assist in determining the direction and speed of vehicles within the train system. In some embodiments, such intervals are regular. In other embodiments, such intervals may vary in their extent. The LIDAR detectors (131) may be installed in any position having a line of sight to the track areas being monitored. For example, the LiDAR detectors (131) may be mounted on the ground in between tracks within the train system as shown in FIG. 2. In other embodiments, the LIDAR detectors (131) may be mounted on a structure above ground, either beside or over the relevant track or tracks being monitored. In yet other embodiments, the LiDAR detectors (131) are mounted to structures holding or mounting other components of the system, such as a priority detector (107). The system (100) may utilize any and different mounting schemes for the placement of the LIDAR detectors (131) as long as the LIDAR detectors (131) generally have sufficient line of sight to the track areas being monitored.

Power for the LIDAR detectors (131) may come from any source or combination of sources. For example, in an embodiment, each LIDAR detector (131) has its own connection to the local power grid. In other embodiment, each LIDAR detector (131) may be powered by connections to other components of the system, such as priority detectors (107). In some embodiments, connections to the local power grid may be supplemented or replaced by connections to locally generated power (e.g., solar, wind, and/or other power sources) or to batteries. Such batteries may be used to supply power during outages in the local power grid.

In some embodiments, the LiDAR detectors (131) may be in communication with system components, such as some priority detectors (107), in order to allow the LIDAR detectors (131) to communicate with the system (100) and components of the system, including any PNUs (102) in the area of a given LiDAR detector (131). A priority detector (107) may be used in such an embodiment at least because priority detectors (107) are capable of communicating with the system (100) and are typically arranged proximate to or in the track areas within the train system, often at intervals. In some embodiments, however, the LIDAR detectors (131) may integrate sufficient communications equipment, such as a receiver, a transmitter, and/or related antennas, to communicate with the system (100) without the assistance of another component of the system.

When the LiDAR system is active, in an embodiment, the LIDAR detectors (131) may typically emit laser light in one or two directions corresponding with the travel directions of the given track. A single LIDAR detector (131) may be capable of emitting light in both directions. In other embodiments, two or more LIDAR detector (131) may be used at any given point along the track with one emitting laser light in each track direction, which setup may increase the accuracy and responsiveness of the LiDAR system. Further, a given LIDAR detector (131) may be capable of monitoring multiple parallel tracks at a given time. However, in other embodiments, a single track may be monitored by a given LIDAR detector (131), which setup may increase the accuracy and responsiveness of the LiDAR system. In yet other embodiments, the LiDAR detectors (131) may be arranged besides the track areas to be monitored, and the LIDAR detectors (131) may monitor the track area or areas, for one or more tracks, within the line of sight of the LIDAR detectors (131).

In the case of using a LIDAR system within the system (100), an example of a single LIDAR detector that monitors both travel directions (e.g., North and South) of a single track will now be explained. First, the LIDAR detector (131) may emit, either simultaneously or successively, laser light in both track directions. Then, the LIDAR detector (131) may wait for reflected laser light to return to the LIDAR detector (131). Note that the LIDAR detector (131) typically will have been previously calibrated for an open track reading where no train is approaching from either track direction. This calibration will set a baseline reflection reading for the LIDAR detector (131) so that it may determine when no vehicle is approaching. Thus, in the case where no train is approaching, the received reflections detected by the LIDAR detector (131) will be the same as when calibrated. The LIDAR detector (131) may then output to the priority detector (107) or other component of the system that no train is approaching. On the other hand, when a vehicle is approaching the LIDAR detector (107), the LIDAR detector (107) may determine the speed and direction of the vehicle by using the process discussed above, a similar process, or other processes known by persons of ordinary skill in the art. Again, a single LIDAR detector (131) may collect data in both track directions or two (or more) LIDAR detectors (131) may be used, wherein one LIDAR detector (131) senses in one of the respective track directions. Further, the LIDAR detectors (131) again may be located at the sides of the tracks and track areas being monitored.

The output from a LIDAR detector (131), or from the priority detector (107) or other component of the system, when a train is sensed (or periodically, or based on other criteria known to persons of ordinary skill in the art) may be an AVL packet. The AVL packet may be sent to the system (100) as described above with reference to the AVL packets sent from a VCU (103). Typically, the AVL packets from the LIDAR detector (131), or from the priority detector (107) or other component of the system, will include at least the following information: (a) information about the location of the LiDAR detector (131) relative to a position along the center of the relevant track that is nearest to the LIDAR detector; (b) the LiDAR detected vehicle speed; and (c) the LIDAR detected direction information, which is typically either away from or towards the LIDAR detector. For embodiments wherein a single LIDAR detector (131) senses in both track directions, additional information about the track direction being sensed may be communicated. For embodiments that use the priority detector (107) or other component of the system for communication, the AVL packet may also identify the relevant priority detector (107) or other component of the system. In any case, the LIDAR system is generally capable of communicating to the system (100) the travel direction and speed of a detected vehicle.

In some embodiments, all PNUs (102) within range of the LIDAR detector (131), priority detector (107), or other relevant component of the system may receive AVL packets sent by the LIDAR system. In some embodiments, the PNUs (102) may process the AVL packets from the LIDAR system similarly to an AVL packet originating from a VCU (103). In other embodiments, the PNUs (102) may have a special process for the AVL packets from the LIDAR system.

Based on the spacing (and monitoring direction) of the LiDAR detectors (131) and the lengths of vehicles in the train system, a vehicle may be detected by more than one LIDAR detector (131), each of which are at different locations. This may result in each LIDAR detector (131) sending AVL packets to the system (100) and any PNUs (102) in range. In an embodiment wherein the vehicles are without VCUs (103) but AVL packets from VCUs (103) and LIDAR detectors are processed the same, such an event would likely be understood by the system (100) as sensing two different vehicles. Thus, at least to reduce over detection, the PNUs (102) may process the AVL packets from the LIDAR system differently than VCU (103) based AVL packets. Further, or alternately, the transmission of AVL packets from a triggered LiDAR detector (131) (or priority detector (107) or other relevant component of the system) may be configured to continue for a preset time after the vehicle passes or after a calculated time delay based upon the speed of the vehicle as it left the detector's range. This may allow the system (100) to better understand the nature of multiple detections.

In some embodiments, the LIDAR system's precision may depend, at least in part, on the spacing of the LIDAR detectors (131), priority detector (107), or other relevant component of the system. The precision may also rely on whether a single LiDAR detector (131) is detecting in both track directions or if one or more LiDAR detectors (131) are detecting in each direction and each LIDAR detector (131) only detects in their single track direction. When opposing LiDAR detectors (131) are used, speed readings from each opposing LiDAR detector (131) may be compared to enhance the precision of the LIDAR system. Further, any variation between the detections from empty track measurements may be monitored to determine if either opposing LIDAR detector (131) requires servicing.

Further, where both VCUs (103) and LIDAR detectors (131) are present in a system (100), the system (100) and/or PNUs (102) may process the AVL packets from each and make real-time or nearly real-time determinations based on all AVL packets received. Further, a LIDAR system may be mounted on the vehicle and act as an onboard wall and/or speed detector for the vehicle equipped with the LIDAR system acting to supplement or supplant the location detection information as contemplated for radio wave detection above.

In another embodiment, the safety system (101) is further comprised of a centralized control server (104). The centralized control server (104) is generally a computer or series of computers that link other computers or electronic devices together. Generally, any known combination or orientation of server hardware and server operating systems known to those of ordinary skill in art is contemplated. As detailed more fully at other locations within this application, the centralized server (104) is communicably linked to the PNUs (102), VCUs (103), and plurality of priority detectors (107) in the system by a wireless network or a combination of a wired and wireless network that allows for the transmission of information and data, potentially allowing centralized control of the safety system (101). In one embodiment, the centralized control server (104) will have a plurality of central monitors upon which worker/PNU locations, activity from PNUs (102), activity from VCUs (103), and vehicle location and speed (along with other information, such as track and direction information) can be depicted in real-time. Further, in another embodiment, central monitor software will be installed on the central control server (104) that will provide for the display of real-time vehicle and worker locations, retrieval of activity logs, program updates, and the configuration of system settings. Generally, any software application known to those of ordinary skill in the art that would provide transit operators and authorities the capability of monitoring VCU (103) and PNU (102) activity and location in the train system in real-time is contemplated in this application.

In another embodiment, the system (101) will be further comprised of a plurality of priority detectors (107). The priority detectors (107), as that term is used herein, are wayside devices capable of receiving radio frequency (RF) signals and forwarding the received data through the network to a plurality of signal controllers, a plurality of VCUs (103), a plurality of PNUs (102), the centralized control server (104), and other known and contemplated components of the system (101). These priority detectors (107) may generally be located at various locations along a particular vehicle's route (108). For example, one common location for priority detectors (107) may be at or in close proximity to track intersections. Generally, these priority detectors (107) function as intermediaries in the overall system (101), receiving signals from the central control server (104), VCUs (103), and/or PNUs (102) and forwarding the real-time vehicle and worker activity and alert notifications received in these signals to the central control server (104), VCUs (103), and/or PNUs (102).

While the invention has been disclosed in conjunction with a description of certain embodiments, the detailed description is intended to be illustrative and should not be understood to limit the scope of the present disclosure. As would be understood by one of ordinary skill in the art, embodiments other than those described in detail herein are encompassed by the disclosed invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "circular" are purely geometric constructs and no real-world component is a true "circular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A method for alerting a worker to potential danger, the method comprising:

equipping a worker with a personal notification unit (PNU);

equipping a vehicle with a vehicle communication unit (VCU);

establishing a work zone where workers are potentially in danger from an approaching vehicle;

establishing a safe zone where workers are not in danger from an approaching vehicle;

said VCU transmitting vehicle information, said vehicle information including at least one of a speed of said vehicle, a direction of travel of said vehicle, an estimated time of arrival of said vehicle to a predetermined point, or a location of said vehicle relative said work zone, to said PNU;

said PNU determining if said PNU is within said work zone or said safe zone upon receiving said vehicle information;

if said determining determines said PNU is within said safe zone, said PNU not issuing an alert to said worker; and if said determining determines said PNU is within said work zone:

said PNU determining a level of danger said worker equipped with said PNU is in from said vehicle based at least in part on said vehicle information; and said PNU issuing an alert to said worker, said alert being proportional to said level of danger; and said PNU ceasing said alert if said PNU is determined to move from said work zone to said safe zone.

2. The method of claim 1, wherein said VCU utilizes satellite location information to determine said speed of said vehicle, said direction of travel of said vehicle, said estimated time of arrival of said vehicle to a predetermined point, and/or said location of said vehicle relative said work zone.

3. The method of claim 1, wherein said PNU determines if said PNU is within said work zone or said safe zone by using satellite location information.

4. The method of claim 1, wherein said PNU is unable to utilize satellite location information to determine if said PNU is within said work zone or said safe zone.

5. The method of claim 4, wherein said PNU utilizes location relative to a beacon placed in said work zone to determine if said PNU is within said work zone or said safe zone.

* * * * *